United States Patent [19]

Noguchi

[11] Patent Number: 4,781,438
[45] Date of Patent: Nov. 1, 1988

[54] ACTIVE-MATRIX LIQUID CRYSTAL COLOR DISPLAY PANEL HAVING A TRIANGULAR PIXEL ARRANGEMENT

[75] Inventor: Kesao Noguchi, Tokyo, Japan

[73] Assignee: NEC Corporation, Japan

[21] Appl. No.: 149,629

[22] Filed: Jan. 28, 1988

[30] Foreign Application Priority Data

Jan. 28, 1987 [JP] Japan .................................. 62-19100

[51] Int. Cl.⁴ .............................................. G02F 1/13
[52] U.S. Cl. ................................ 350/339 F; 350/333; 350/336; 340/784
[58] Field of Search ..................... 350/333, 336, 339 F

[56] References Cited

U.S. PATENT DOCUMENTS

| | | | |
|---|---|---|---|
| 3,840,695 | 10/1974 | Fischer | 350/345 X |
| 4,368,523 | 1/1983 | Kawate | 350/333 X |
| 4,568,149 | 2/1986 | Sugata et al. | 350/339 F X |
| 4,589,733 | 5/1986 | Yaniv et al. | 350/333 X |
| 4,704,559 | 11/1987 | Suginoya et al. | 350/339 F X |
| 4,743,099 | 5/1988 | Dickerson et al. | 350/333 X |

FOREIGN PATENT DOCUMENTS 2130781A  6/1984  United Kingdom ................ 350/333

Primary Examiner—Stanley D. Miller
Assistant Examiner—Richard Gallivan
Attorney, Agent, or Firm—Laff, Whitesel, Conte & Saret

[57] ABSTRACT

An active-matrix liquid crystal color display panel includes lines of color pixel elements composed of first, second and third types of cell elements, each cell element having two display electrodes each connected to a video signal bus running therebetween through parallely connected two thin film FET's (TFT's) having gates connected to different scanning signal buses, the first, second and third types of cell elements having different one of three primary color filters, and repetition of the color pixel elements in adjacent line being shifted with a half length of the color pixel element to form triangular color pixel arrangement.

12 Claims, 6 Drawing Sheets

ACTIVE-MATRIX LIQUID CRYSTAL COLOR DISPLAY PANEL HAVING A TRIANGULAR PIXEL ARRANGEMENT

BACKGROUND OF THE INVENTION

1. Field of the Invention

This invention relates to an active-matrix liquid crystal color display panel having a triangular pixel arrangement, and more particularly to an improvement for high quality color image.

2. Description of the Related Art

Recently, a liquid crystal color display panel has been remarkably progressed and is demanded to image a high quality color picture. An active-matrix liquid crystal display panel using thin film field effect transistors (hereinafter, referred to TFT) as switches has been recognized, in recent years, as preferable to image a fine high quality color image.

One pixel element is formed of a TFT and a display electrode. A plurality of pixel elements are disposed in a matrix form on a transparent glass substrate. The TFT's are driven by access signal buses (or scanning buses) and data signal buses (or video signal buses) disposed between pixel elements to form a lattice. Scanning signals are applied to TFT's through the access buses. Video signals are applied to the data buses to be supplied to selected display electrodes through TFT's which are turned on by the scanning signals.

In a color display, one color pixel element has three or four pixel elements (hereinafter, referred to cell element for imaging primary color components. Therefore, compared to a black-and-white display, number of cell elements required is more than three times. The larger the number of color pixel elements (that is, the number of cell elements), the higher the resolution of the obtained color image becomes. However, if the number of cell elements is increased, the time duration for driving one cell element becomes short to decrease the effective voltage applicable to liquid crystal, resulting in a poor quality of imaged picture. In this point of view, the activematrix liquid crystal color display panel is superior to other types of liquid crystal display panel. The activematrix type is small in decrease of the effective voltage applied to liquid crystal, if the driving time duration becomes short. However, in a case where the number of cell elements are greatly increased for obtaining a high quality color image, the driving time duration becomes too short to apply the sufficient effective voltage to the liquid crystal in the active-matrix type color display panel.

An arrangement for prolonging this driving time duration is to form one cell element with one display electrode and two TFT's and to successively drive those two TFT's by adjacent two access buses. By this arrangement, the time duration for applying a video signal to one display electrode becomes double, compared to the case where one TFT is coupled to one display electrode. However, since one access bus simultaneously drives adjacent two cell elements in the direction parallel with data signal bus, all the cell elements in the direction parallel with the data bus have to receive a video signal of the same color. This means the primary color pixel arrangement is limited to be a stripe type. The stripe type color pixel arrangement has the same color cell elements in a line and is poor in image quality.

The image quality is improved by the triangular color pixel arrangement. K. Noguchi et al. proposed one improvement for the triangular color pixel element in U.S. patent application (Ser. No. 823,104) filed on Jan. 27, 1986. One cell element in one color is divided into two parts each having one TFT and one display electrode. The drain electrodes and gate electrodes of the two TFT's are connected to the same data bus and the same access bus. The two-part-set cell elements are connected to every access buses. But every other two-part-set cell elements are disposed on one side of the access buses, while the other two-part-set cell element are disposed on the other side of the access buses. Two two-part-set cell elements on one side of the access bus and one two-part-set cell element on the other side of the access bus form one color pixel element having a triangular shape. The arrangement of the color pixel elements along the access buses is shifted with a half pitch of one color pixel element between adjacent two access buses. This arrangement images a high quality picture. However, there is one drawback of a linedefect which appears if one access bus or data bus has an opencircuit introduced in a manufacturing process. This linedefect spoils the imaged picture.

SUMMARY OF THE INVENTION

It is a primary object of the present invention to provide an active-matrix liquid crystal color display panel having a high density of pixel elements and imaging a high quality picture which is not spoiled by a small number of open-circuits in access buses.

According to the present invention, there is provided an active-matrix liquid crystal color display panel comprising a plurality of access signal buses (or scanning lines), a plurality of data signal buses (or video signal lines) orthogonaly crossing but separated from the access buses, a matrix of display electrodes formed of a plurality of columns parallel with the access buses and rows parallel with the data buses, each of the display electrodes being disposed in a space surrounded by two adjacent access buses and two adjacent data buses, a plurality of switching transistors having a gate electrode, a drain electrode and a source electrode, each of the display electrodes being connected to the source electrodes of two switching transistors, the gate electrodes of the two switching transistors being connected to the adjacent two access buses running both sides of the display electrode which is connected to the source electrodes of the two switching transistors, and the drain electrodes of the switching transistors having source electrodes connected to a pair of adjacent two display electrodes along the access buses being connected to the same data bus running between the pair of two display electrodes, each pair of two display electrodes in every other columns of the display electrode matrix being formed of two display electrodes on both sides of every other data buses and each pair of two display electrodes in the other columns being formed of two display electrodes on both sides of the other data buses, and a color filter having a plurality of filters each covering the pair of display electrodes and transmitting predetermined color components, filters transmitting different color components being repeatedly arranged in lines above the columns of display electrodes, the arrangement of the filters being shifted between adjacent lines with a half of total length of the filters to form a color pixel.

In the present invention, one display electrode is supplied with video signals from the same data bus through two switching transistors driven by adjacent two access buses. The time duration for being supplied with video signal is prolonged. Therefore, in an active-matrix liquid crystal color display panel having an increased number of pixel elements, high effective voltage can be applied to the liquid crystal to image a high quality picture. Furthermore, since one display electrode is connected to adjacent two access buses through switching transistors, small number of open-circuits in access buses does not affect the imaged picture. The display electrodes coupled to the open-circuited access bus can be made access from the other access bus having no open-circuit. Thus, the present invention images a high-quality natural picture with increased number of color pixel elements driven by a high effective signal voltage, even if small number of open-circuits exist in access buses.

BRIEF DESCRIPTION OF THE DRAWINGS

The above and further objects, features and advantages of the present invention will become more apparent from the following detailed description taken in conjunction with the accompanying drawings, wherein.

Figure 1:
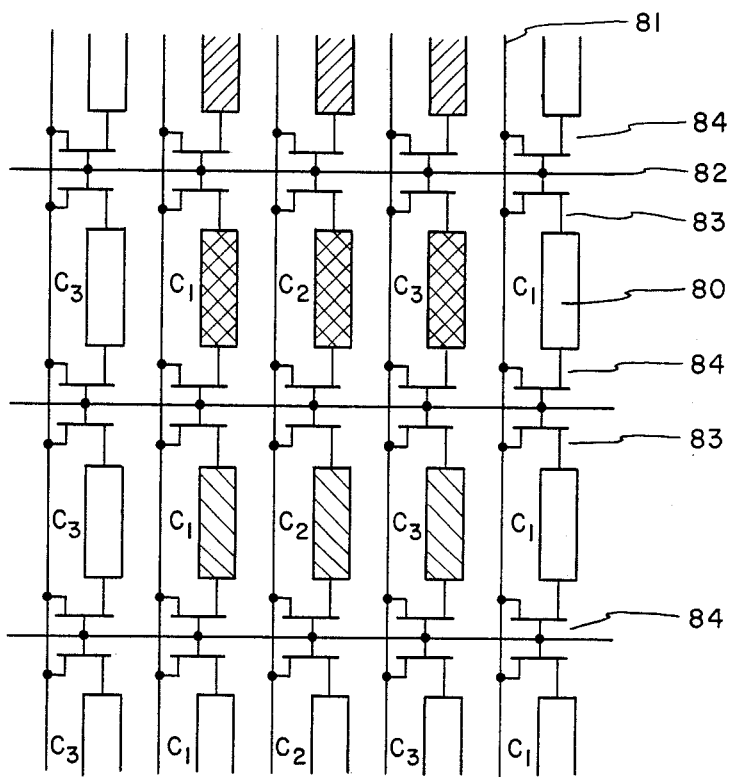
FIG. 1 is a schematic plan view of a part of an active-matrix liquid crystal color display panel in the prior art.

First prior art of an active-matrix liquid crystal color display panel has display electrodes 80 supplied with video signals through two TFT's 83 and 84 driven by adjacent two access buses 82, as shown in FIG. 1. A plurality of sets of the display electrode 80 and a pair of TFT's 83 and 84, a plurality of parallely arranged access buses 82 and a plurality of data buses 81 disposed orthogonally to the access buses 82 are formed on a transparent glass substrate. Every one display electrode 80 positions in every one space surrounded by two access buses 82 and two data buses 81 and connected to source electrodes of the pair of TFT's 83 and 84. Source electrodes of the pair of the TFT's 83 and 84 are connected to their left-side data bus 81. The display electrodes 80 labeled as "$C_1$", "$C_2$" and "$C_3$" form one color pixel element by covered respectively with red, green and blue filters. In the lines of the access buses 82, the red, green and blue filters cover repeatedly the display electrodes 80.

The access buses 82 are scanned to drive selected TFT's. Video signal is supplied to the display electrodes 80 through the data buses 81 and the driven TFT's. Therefore, one display electrodes 80 are supplied with the video signal for a time period when the TFT's 83 and 84 are driven. The time periods are double, compared to a time period when one TFT is driven. This results in that a sufficient effective voltage for driving liquid crystal is applied to the display electrode. In other words, the number of color pixel element can be increased without lowering the effective video voltages at the display electrodes 80.

However, since the video signal is supplied through the data buses 81 and one access bus drives two TFT's coupled to two display electrodes on both sides of the access bus, all the filters covering display electrodes 80 aligned in parallel with data buses must be same color. Thus color filter is limited to a stripe type. The image displayed by the stripe type color filter is poor in quality and is not natural.

Figure 2:
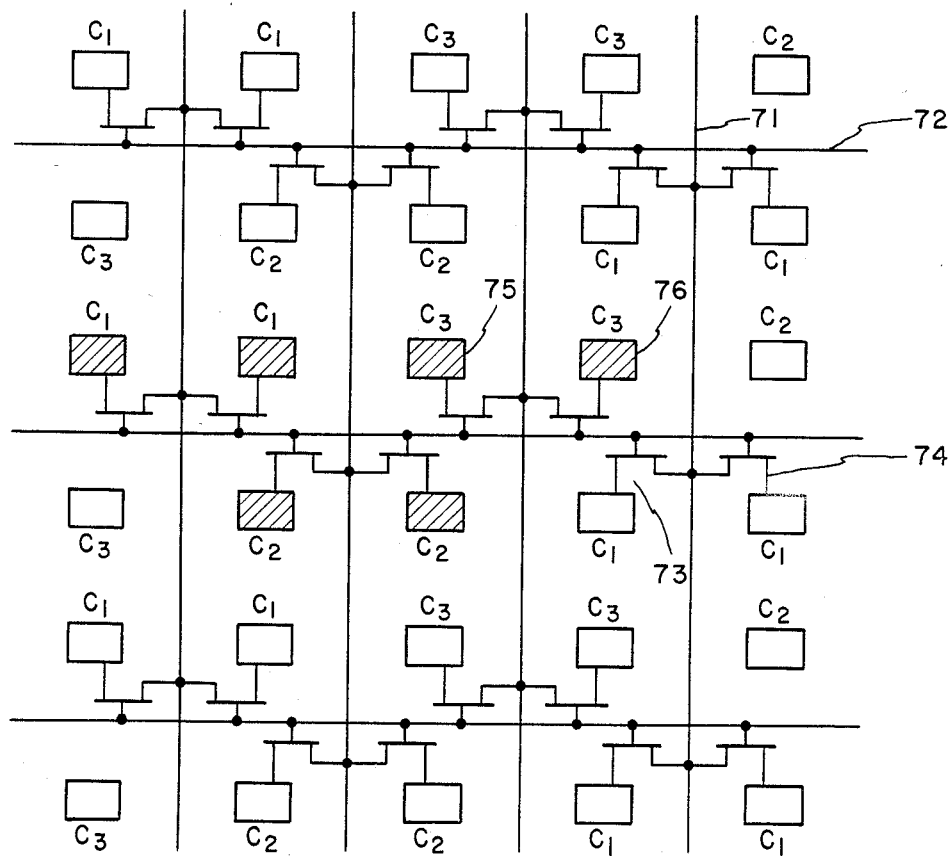
FIG. 2 is a schematic plan view of a part of another active-matrix liquid crystal color display panel in a prior art.

The natural image can be improved by use of a color filter having a triangular color pixel elements. An active-matrix liquid crystal color display using the color filter having a triangular color pixel elements is drawn in FIG. 2. One cell element has a pair of TFT's 73 and 74 and a pair of display electrodes 75 and 76. Each display electrode is supplied with a video signal through a bus 71 and a TFT. The display electrodes are disposed on both sides of one bus 72. Gate electrodes of a pair of TFT's 73 and 74. The pairs of display electrodes coupled to every other data buses are disposed on one side of the access bus 72 while the other pairs of display electrodes coupled to the other data buses are disposed on the other side of the access bus. The display electrodes labeled as "$C_1$", "$C_2$" and "$C_3$" form one color pixel element by covered with red, green and blue filters, respectively. On lines of display electrodes aligned in parallel with access buses, an arrangement of an order of red ($C_1$), red ($C_1$), blue ($C_3$), blue ($C_3$), green ($C_2$) and green ($C_2$) filters is repeated. The filter arrangement is shifted between adjacent two lines of display electrodes with a half pitch of the the repetition cycle of the color filters to form triangular color pixel elements which are formed of two pairs of display electrodes in one line and one pair of display electrodes in an adjacent line.

Each color pixel element overlaps with adjacent color pixel elements in plan view. Repetition of primary colors is not clear to image a natural picture. However, there is a drawback that one open-circuit in an access bus results in a loss of operability of all TFT's coupled to the defective access bus. Thus, two lines of display electrodes on both sides of the defective bus are not supplied with video signal. A line defect appears on a imaged picture.

DESCRIPTION OF PREFERRED EMBODIMENT

Figure 3:
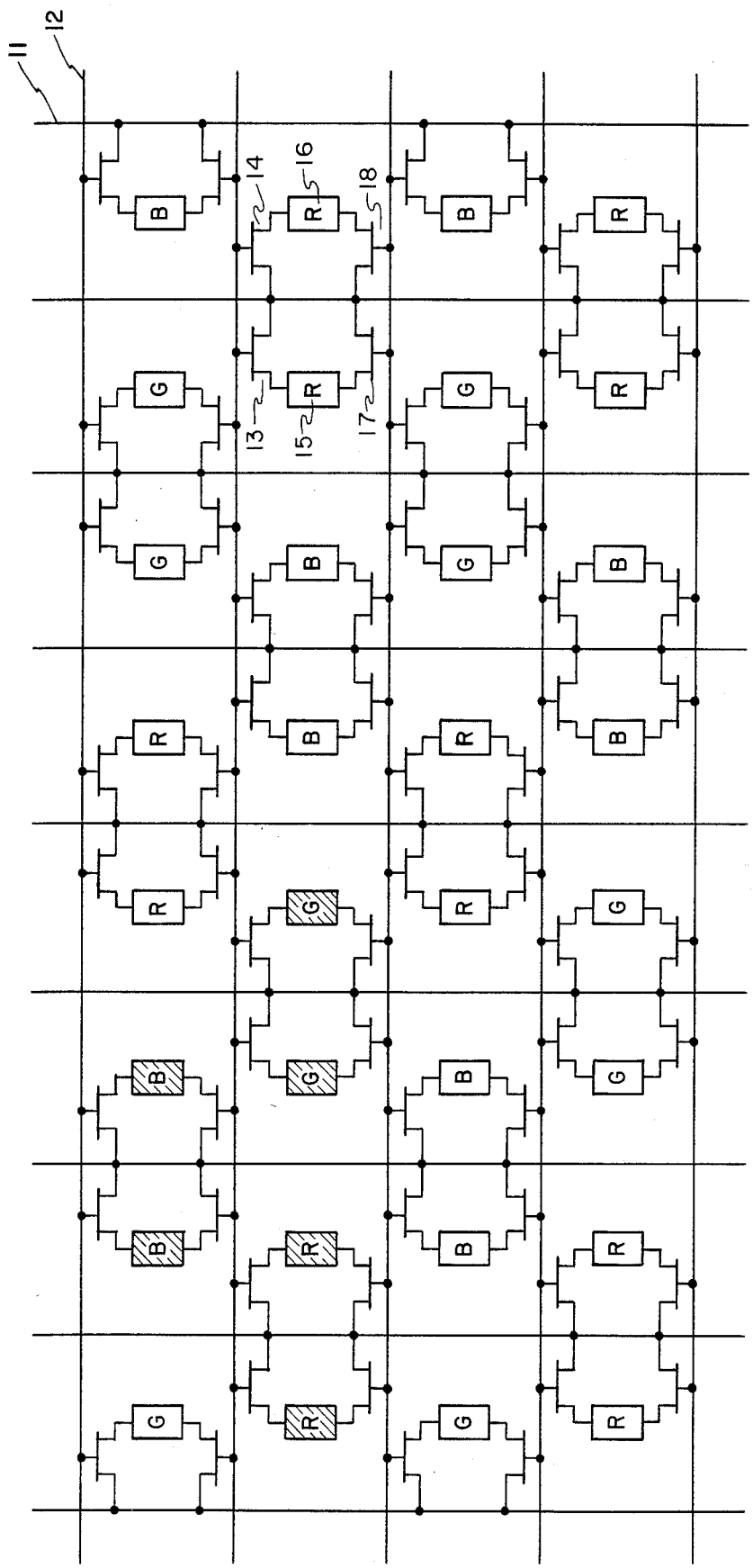
FIG. 3 is a schematic plan view of a part of an active-matrix liquid crystal color display panel according to a first preferred embodiment of the present invention.

One cell element in an active-matrix liquid crystal color display panel according to a first preferred embodiment has a pair of display electrodes 15 and 16, as shown in FIG. 3. The display electrodes 15 is connected to a source electrode of a TFT 13 which has a gate electrode connected to a gate bus 12 running on an upper side of the pair of display electrodes 15 and 16 and a drain electrode connected to a data signal bus 11 running between the pair of display electrodes 15 and 16. The display electrode 15 is also connected to a source electrode of a TFT 17 which has a gate electrode connected to an access signal bus 12 running on a lower side of the pair of display electrodes 15 and 16 and a drain electrode connected to the same data signal bus 11. Similarly, the other display electrode 16 is connected to source electrodes of two TFT's 14 and 18. The gate electrodes of the two TFT's 14 and 18 are respectively connected to gate buses 12 running on upper and lower sides of the pair of display electrodes 15 and 16. The drain electrodes of the two TFT's 14 and 18 are connected commonly to the same data bus 11 running between the pair of display electrodes 15 and 16.

A plurality of the cell elements are formed at every other data bus and form a line of cell elements. The lines of cell elements are formed in every region between two adjacent access buses 12. The data buses connected to the pixel elements are different between the neighbouring lines of cell elements.

The cell elements, the data buses and the access buses are formed on a transparent glass substrate to form a TFT array board. A layer of liquid crystal and a common electrode thereon connected to a reference potential cover the TFT array board and a layer of color filter is formed thereon. The color filter includes red filter elements "R", green filter elements "G" and blue filter elements "B" which are respectively positioned above the respective display electrodes. Each filter element may have an area covering each of the display electrodes 15 and 16 or each pair of the display electrodes 15 and 16. On a line of cell elements, the arrangement of the red filter element(s), the green filter element(s) and the blue filter element(s) is repeated. The repetition of the filter element arrangement is shifted between neighbouring lines of the cell elements with a half of a repetition pitch. This shift forms a triangular color pixel element as shown by hatched display electrodes.

Figure 4:
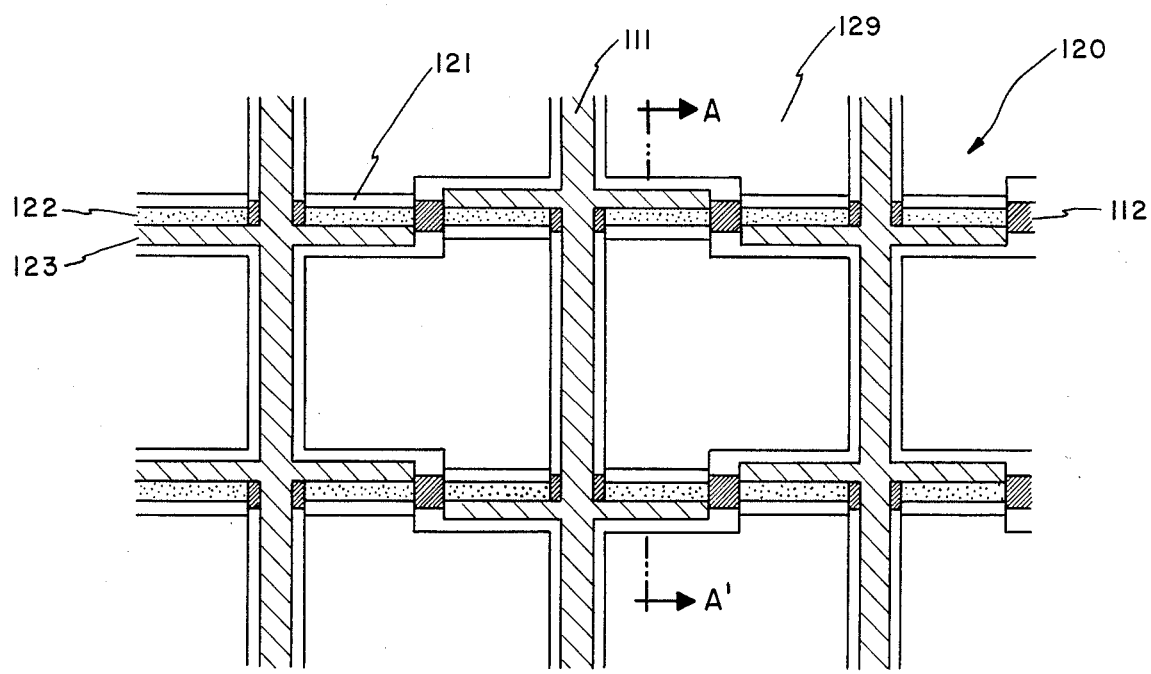
FIG. 4 is a plan view of a part of TFT array board used in the first preferred embodiment of the present invention.
Figure 5:
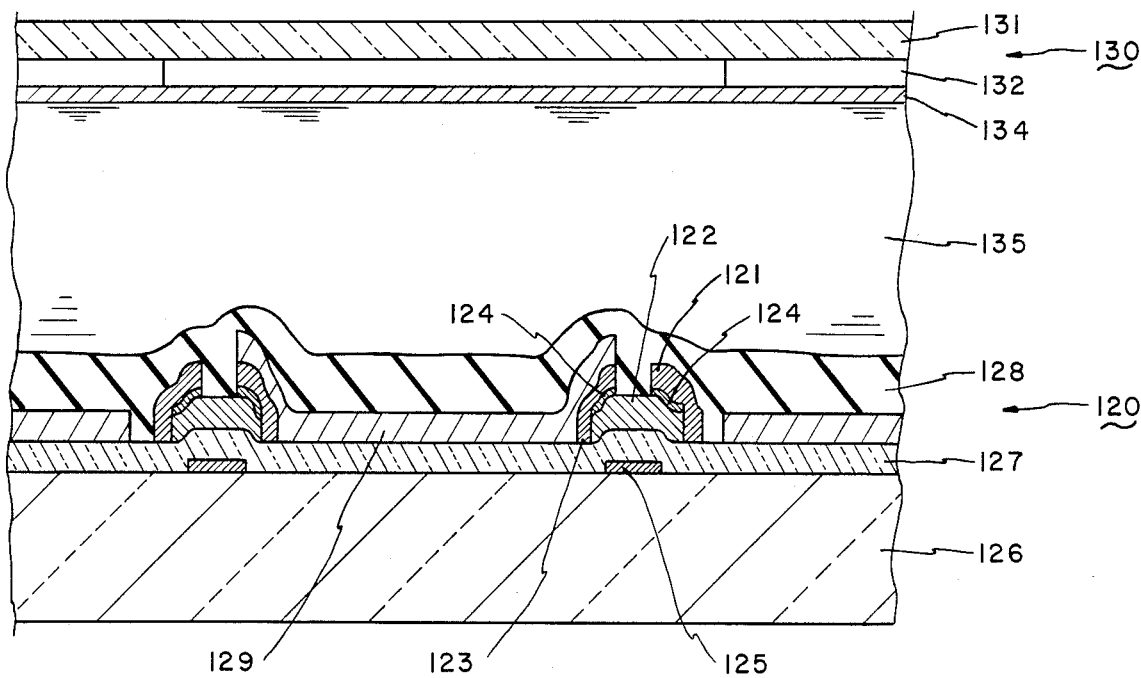
FIG. 5 is a sectional view taken along A—A' of FIG. 4.

The active-matrix liquid crystal color display panel will be further explained in more practical form. A part of TFT array board and a partial section of the color display panel are shown in FIGS. 4 and 5 with same reference numerals. A plurality of access buses 125 serving as gate electrodes are formed in parallel with one another on a transparent glass substrate 126 with chromium (Cr) of 1500 Å and covered with an insulator film 127 of silicon nitride of 3,000 Å. Amorphous Si films 122 of $n^-$-type are formed with a thickness of 2,000 Å on the insulator film 127 above the access buses 125 to operate as channel regions of TFT's. $N^+$-amorphous Si films 124 are formed with a thickness of 200 Å as source and drain regions on the amorphous Si films 122. Drain electrodes 121 and data buses 111 are formed on the $N^+$-amorphous Si films 124 and on the insulator film 127, with Cr of 3,000 Å. The data buses 111 are arranged to be in parallel with one another and to cross orthogonally the access buses 125. The source electrodes 123 is formed with Cr of 3,000 Å to cover the $N^+$-amorphous Si films 124 of the source regions and side wall of the amorphous Si films 122. A plurality of display electrodes 129 of ITO having a thickness of 1,500 Å are formed on regions of the insulator film 127 surrounded by two access buses 125 and two data buses 111. The peripheral portion of each display electrode 129 is overlapped with the source electrode 123 to which the display electrode is to be connected. The TFT's and the display electrodes 129 are covered with a protection film 128 of polyimide. Liquid crystal 135 is interposed between the TFT array board 120 and a common electrode 134 which is connected to ground. A color filter 130 is located thereon. The color filter 130 has a plurality of red, green and blue filter elements 132 on a transparent glass board 131. The arrangement of the red, green and blue filter elements 132 is as explained with reference to FIG. 3.

The color pixel elements have a triangular form and overlap with their side color pixel elements in plan view. The imaged picture does not generate moire-image interference fringes. Color uniformity is superior to feel the imaged picture natural. Thus, since the color display panel has a triangular color pixel arrangement, a high quality image can be produced. Furthermore, one display element is supplied with video signal through two TFT's having gates connected to different access buses. Therefore, if one access bus has an open-circuit, the display electrode can be made access by means of the other access bus. A line defect does not appear on an imaged picture. The open-circuit may occur in a manufacturing process of the TFT array board. The allowance of the small number of open-circuits in access buses raises a production yield and lowers the production cost.

The two-TFT structure has another merit. A scanning pulse of +15 volts is sequentially applied to the access buses 12 from upper one to lower one, while video signals of $+(8\pm x)$ volts are supplied to the data buses 11 in synchronism with the scanning pulse. The value x is varied depending on the tone of the picture. For imaging color picture, red, green and blue video signals are supplied. As apparent from FIG. 3, respective data buses 11 may be supplied with only one of the red, green and blue video signals. This fact simplifies the peripheral circuit for operating the color display panel.

Figure 6:
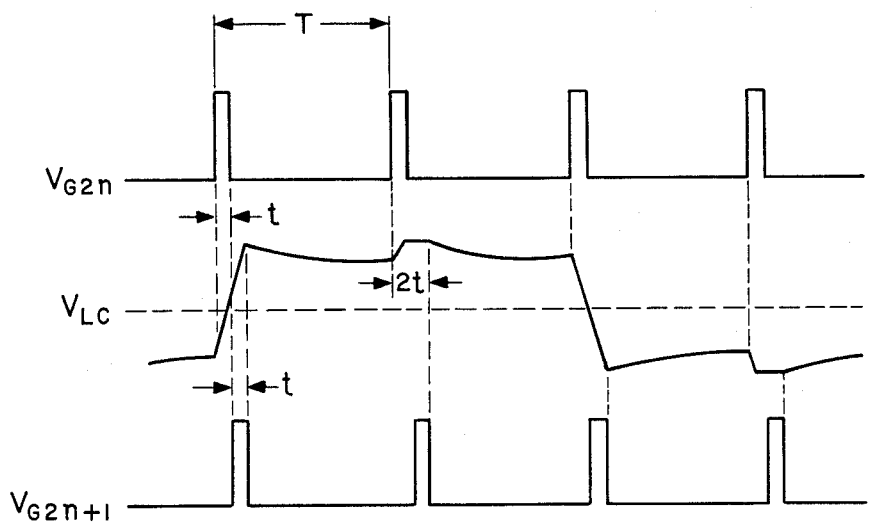
FIG. 6 is a timing chart of scanning pulses and a voltage applied to the liquid crystal in a non-interlacing operation of the first preferred embodiment.

Furthermore, in a non-interlacing operation, the access buses 12 are successively driven by a scanning pulse in an order from upper one to lower one. FIG. 6 shows a timing chart of the scanning pulses applied to the even number of access bus $V_{G2n}$ and the next access bus $V_{G2n+1}$ and voltage $V_{LC}$ applied to the liquid crystal. Since the video signals are supplied to one display electrode for succeeding two periods (2t) when the scanning pulses 151 and 152 are applied to succeeding two access buses, the time 2t for supplying the video signal to one display electrode becomes double, as compared to a case where one TFT is connected to one display electrode. The voltage applied to the liquid crystal decreases with a time constant $CR_{off}$ after the pulse 152 disappears. Since the liquid crystal is sufficiently charged for the elongated charging time 2t, the voltage $V_{LC}$ is kept at high for scanning period T to increase the effective voltage applied to the liquid crystal. The contrast of imaged picture is improved to obtain a high quality picture. In other words, the picture quality is not deteriorated by increasing the number of color pixel elements. Although an access time to one access bus decreases by increasing the cell element number, the access time to one display electrode does not become short. A fine, high contrast and wide image can be obtained.

Figure 7A:
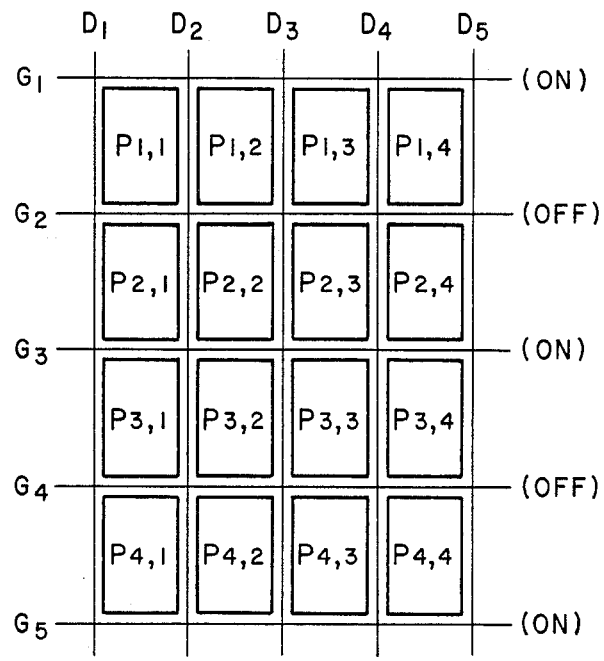
FIGS. 7(a) and 7(b) are schematical diagrams of a part of first preferred embodiment shown in FIGS. 3, 4 and 5, for explaining an interlacing operation.
Figure 7B:
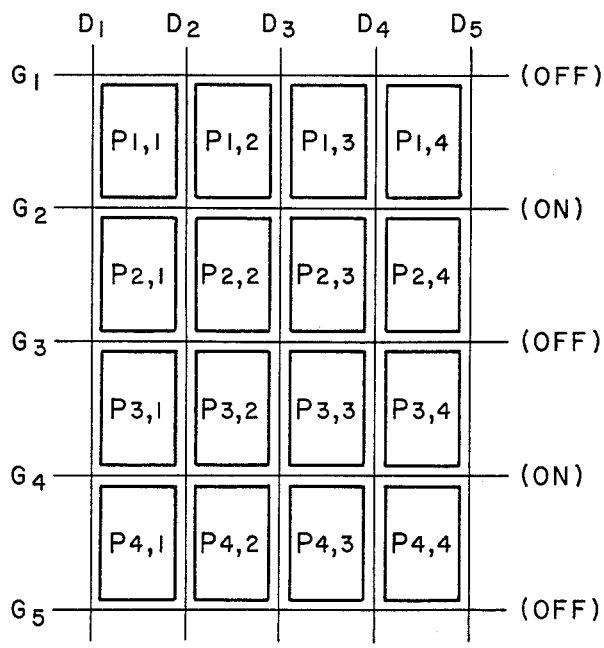

The invention is also advantageous in interlacing operation. An odd number of field is schematically shown in FIG. 7(a), an even number of field being schematically shown in FIG. 7(b). FIGS. 7(a) and 7(b) are simplified diagram of FIG. 3 for explaining the interlacing operation. In an odd number of field, access buses $G_1$, $G_3$, $G_5$... are sequentially supplied with scanning pulses. Each access bus turns on TFT's on both sides to supplied video signals to the display electrodes $P_{m,1}$ ... $P_{m,4}$ and $P_{m+1,1}$ ... $P_{m+1,4}$ ... on both sides through data buses $D_1$ ... $D_5$ ... . Finally, all the display electrodes $P_{11}$, ... $P_{44}$ ... are supplied with video signals in on even number field. In an odd number field, the other access buses $G_2$, $G_4$ ... are sequentially supplied with the scanning pulse. Similarly to the even number field, all the display electrodes $P_{11}$ ... $P_{44}$ ... are supplied with video signals in one odd number field.

Figure 8:
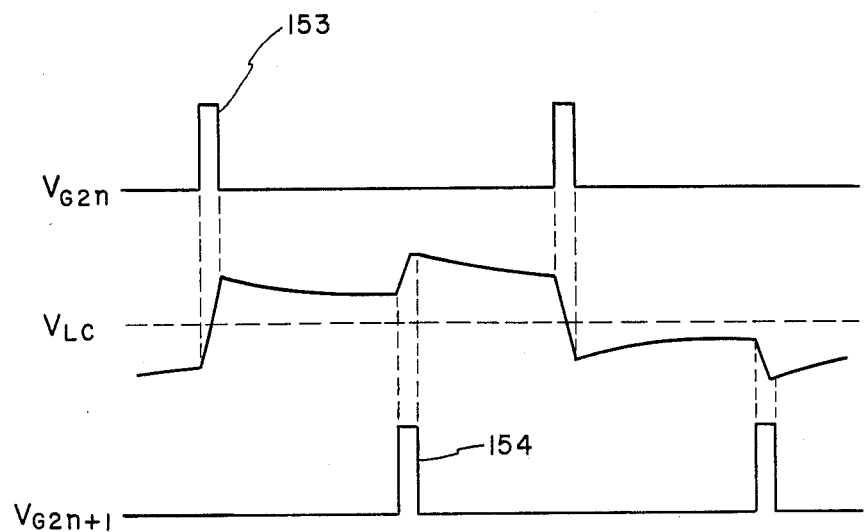
FIG. 8 is a timing chart of scanning pulses and a voltage applied to the liquid crystal in an interlacing operation of the first preferred embodiment.

The scanning pulses applied to the even number access buses $V_{G2n}$ and applied to the next access buses $V_{G2n+1}$ is shown in FIG. 8 together with the voltage $V_{LC}$ applied to the liquid crystal. The video signals are twice applied to the liquid crystal by the scanning pulses 153 and 154.

The liquid crystal is not fully charged during the period of the first scanning pulse 153 which has shortened pulse width for increasing pixel elements. After the first scanning pulse 153, the charges in the liquid crystal are discharged with a time constant $CR_{off}$. Since the charges are not completely discharged until the second scanning pulse 154, charges are added to the liquid crystal by the second scanning pulse 154 to fully increase the voltage $V_{LC}$, resulted in an application of a high effective voltage to the liquid crystal. The increased effective voltage improves a contrast of imaged picture to obtain a high quality. This high quality picture has been maintained in a display panel having 480 scanning lines (i.e. 480 access buses) operated by a frame frequency of 60 Hz with an access time of 35$\mu$ sec.

Figure 9:
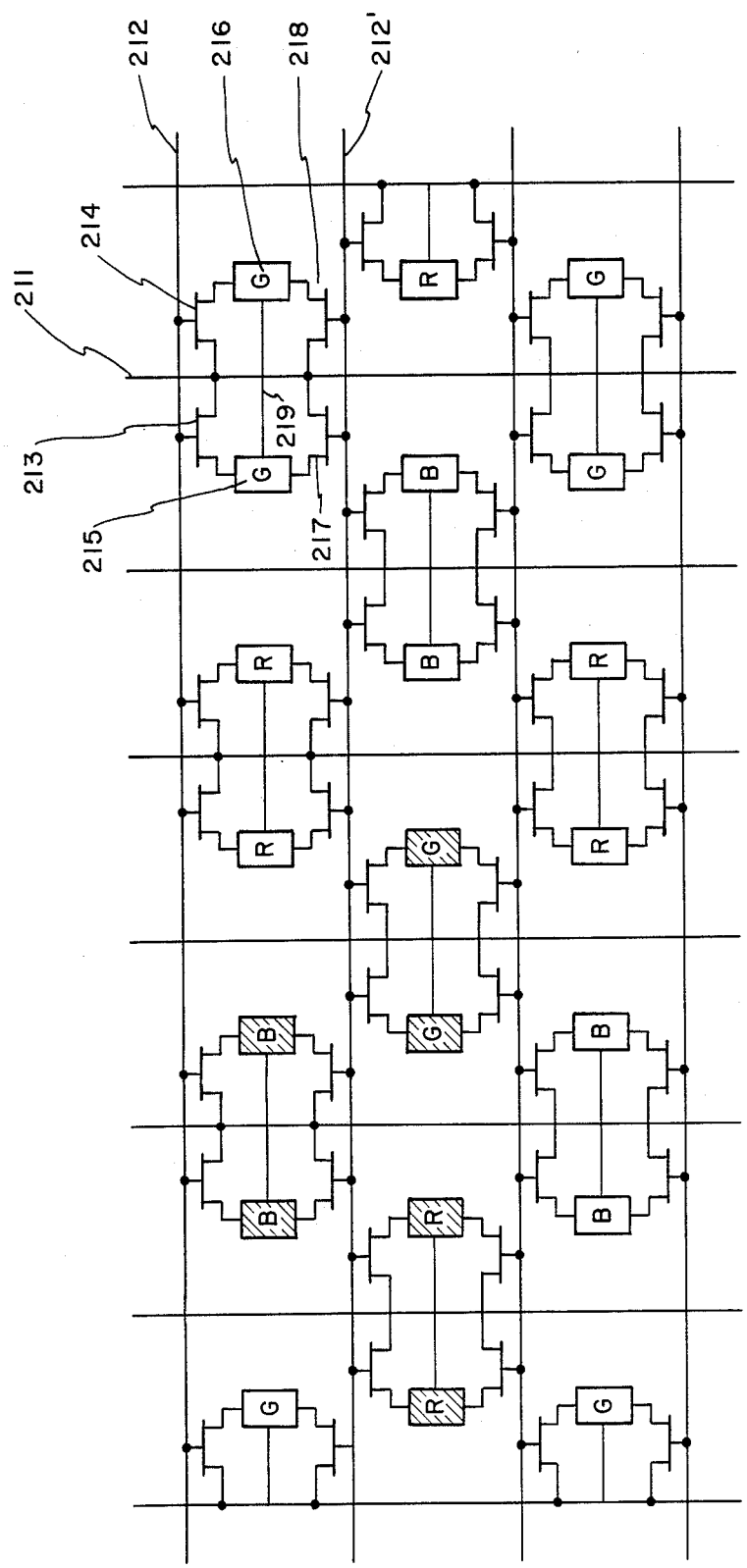
FIG. 9 is a schematic plan view of the active-matrix liquid crystal color display panel according to the second preferred embodiment of the present invention.

The second preferred embodiment of the present invention shown in FIG. 9 has a constructional feature similar to the first preferred embodiment. Each cell element includes a pair of display electrodes 215 and 216 and four TFT's 213, 214, 217 and 218. The display electrode 215 is connected to the TFT 213 controlled by an upper access bus 212 and to the TFT 217 controlled by a lower access bus 212'. The other display electrode 216 is connected to the TFT 214 controlled by the upper access bus 212 and to the TFT 218 controlled by the lower access bus 212'. Red, green and blue filter elements in a color filter cover the display electrodes via a liquid crystal layer and a common electrode to form triangular color pixel elements (one being shown by hatching), similarly to the first preferred embodiment.

A distinctive feature of the second preferred embodiment is an interconnection 219 between the pair of display electrodes 215 and 216. This interconnection 219 may be formed of an ITO film formed on a data bus 211 through additional insulator film of silicon nitride to connect the pair of display electrodes 215 and 216 made of ITO.

The same advantages, merits and features as the first preferred embodiment may be obtained in this second preferred embodiment. Additionally, the interconnections 219 give a redundancy to the TFT array board. Since the pair of display electrodes 215 and 216 are electrically connected, even if one of TFT's 213 and 214 and one of TFT's 217 and 218 are defective and not operable in a manufactured TFT array board, the TFT array board may be employed with or without separating the defective TFT's from data bus and/or display electrode by a trimming technique such as a laser beam trimming.

The present invention provides an active-matrix liquid crystal color display panel in which the number of pixel element may be increased without decreasing a high quality imaged picture, a small number of opencircuits does not lower the imaged quality, a simplified peripheral circuit is required for imaging a color picture.

What is claimed is:

1. An active-matrix liquid crystal color display panel comprising:
    a transparent insulator substrate;
    a plurality of access signal buses formed on said insulator substrate in parallel with one another;
    a plurality of data signal buses formed on said insulator substrate to cross orthogonally said access signal buses;
    a plurality of pixel elements formed on said insulator substrate, each pixel element including first and second display electrodes and first to fourth switching transistors, said first and second display electrodes being respectively disposed in neighbouring spaces surrounded by two access signal buses and two data signal buses, said neighbouring spaces being arranged in the same direction as said access signal buses, said first and second switching transistors having sources connected to said first display electrode, drains connected to the data signal bus running between said neighbouring spaces and gates respectively connected to said two access signal buses, said third and fourth switching transistors having sources connected to said second display electrode, drains connected to said data signal bus running between said neighbouring spaces and gates respectively connected to said access signal buses, said pixel elements being connected to every other data signal bus in stripe regions between adjacent two access signal buses, and said data signal buses to which said pixel elements are connected being different between adjacent stripe regions;
    a filter having a plurality of filter elements disposed over said display electrodes, said filter elements permeating different color components and being repeatedly arranged in the same direction as said access signal buses to form filter element lines, the repetition of said filter elements being shifted between neighbouring filter element lines; and
    liquid crystal interposed between said first and second display electrodes and said filter.

2. An active-matrix liquid crystal color display panel as claimed in claim 1, wherein said switching transistors are thin film field effect transistors.

3. An active-matrix liquid crystal color display panel as claimed in claim 2, wherein said thin film field effect transistors have amorphous silicon as a channel region.

4. An active-matrix liquid crystal color display panel as claimed in claim 3, wherein said filter elements include first, second and third filter elements permeating red, green and blue light, respectively.

5. An active-matrix liquid crystal color display panel as claimed in claim 3, wherein said first and second display electrodes are electrically connected to each other.

6. An active-matrix liquid crystal color display panel as claimed in claim 4, wherein said filter has a plurality of lines formed of said first, second and third filter elements, a repetition cycle of said first, second and third filter elements in every other lines being two of said first filter elements, two of said second filter elements and two of said third filter elements arranged in this order and a repetition cycle of said first, second and third filter elements in the other lines being one of said second filter elements, two of said third filter elements, two of said first filter elements and one of said second filter elements arranged in this order.

7. An active-matrix liquid crystal color display panel comprising lines of color pixel elements, each of said color pixel elements including first, second and third types of cell elements, each cell element having two display electrodes driven by scanning pulses supplied through two first buses, said first, second and third types of cell elements having different one of three primary color filters, and repetition of said color pixel elements in adjacent lines being shifted with a half length of said color pixel element to form a triangular color pixel arrangement.

8. An active-matrix liquid crystal color display panel as claimed in claim 7, wherein said panel has a plurality of first buses arranged in parallel, each line of the color pixel elements being formed between two adjacent first buses, said panel further having a plurality of second buses crossing orthogonally said first buses, and said display electrodes being disposed in spaces separated by said second buses.

9. An active-matrix liquid crystal color display panel as claimed in claim 8, wherein each of said two display electrodes are coupled to said second bus running between said two display electrodes through two switching transistors connected in parallel, operations of said two switching transistors being respectively controlled by scanning pulses supplied through said two first buses disposed on opposite sides of said two display electrodes.

10. An active-matrix liquid crystal color display panel as claimed in claim 9, wherein said switching transistors are thin film field effect transistors having amorphous silicon as a channel region, each of said thin film field effect transistors having a source connected to one of said two display electrodes, a drain connected to one of said second buses and a gate connected to one of said first buses.

11. An active-matrix liquid crystal color display panel as claimed in claim 10, wherein said three primary color filters are red light permeating filters, green light permeating filters and blue light permeating filters.

12. An active-matrix liquid crystal color display panel as claimed in claim 11, wherein said two display electrodes are electrically connected to each other.

* * * * *